April 22, 1941.   D. M. BERGES   2,239,312
ELECTROMAGNETIC APPARATUS
Filed Sept. 24, 1938
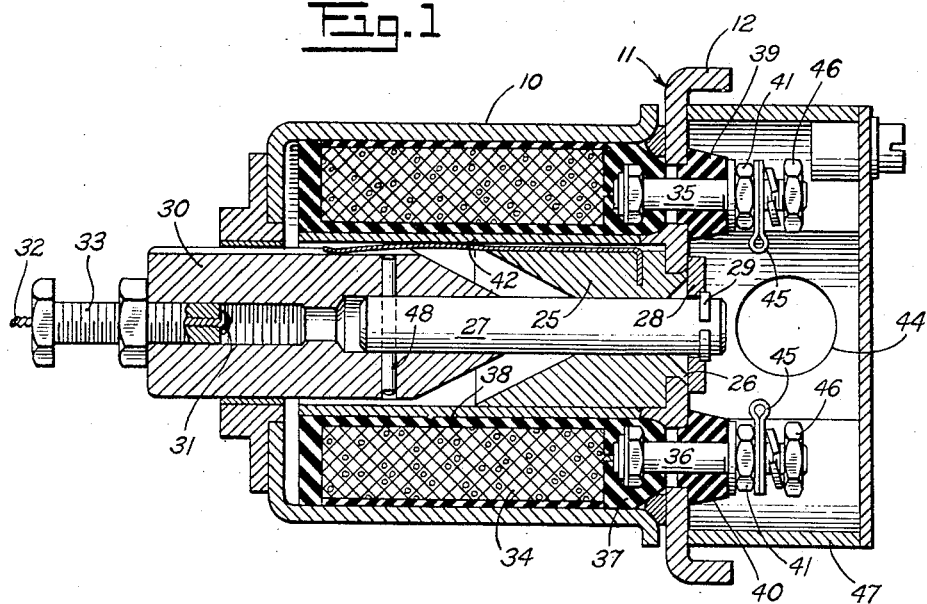
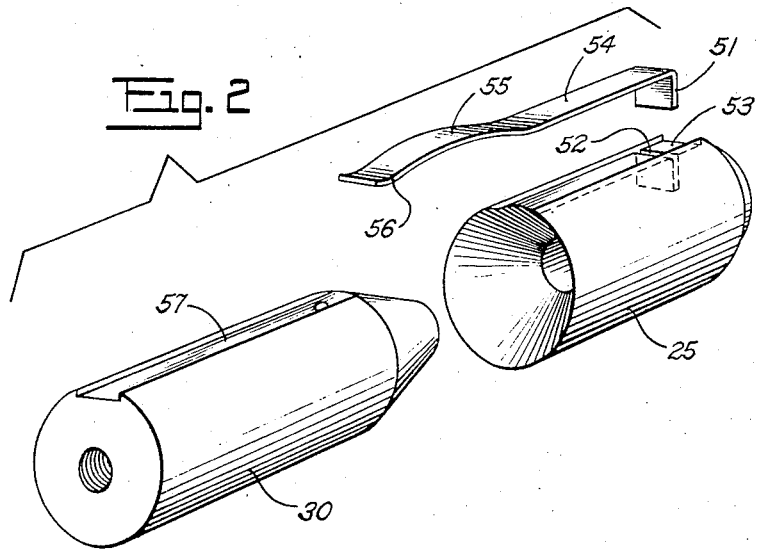
INVENTOR.
Donald M. Berges
BY Martin J. Finnegan
ATTORNEY Patented Apr. 22, 1941

2,239,312

UNITED STATES PATENT OFFICE 2,239,312

ELECTROMAGNETIC APPARATUS

Donald M. Berges, Montclair, N. J., assignor to Bendix Aviation Corporation, South Bend, Ind., a corporation of Delaware Application September 24, 1938, Serial No. 231,587

3 Claims. (Cl. 175—341)

The invention relates to electromagnetic apparatus, and more particularly to the mechanical construction thereof.

An object of the invention is to improve the construction of a solenoid type of electromagnet, particularly with the end in view of reducing the likelihood of undesired movement of the solenoid plunger and parts associated therewith.

Electromagnets of the solenoid type are used extensively in installations of a character involving associated parts wherein vibrational and other disturbances are set up, which disturbances, when communicated to the solenoid assembly, tend to cause corresponding, but quite objectionable vibration and sometimes equally objectionable reciprocatory movement of the solenoid plunger. An object of the present invention is to provide means for counter-acting this tendency and for controlling the effect thereof upon the solenoid plunger.

Other features of the invention reside in the actual construction, inter-relationship, and method of assembly and operation of the parts, as more fully disclosed in the following description and accompanying drawing. It is to be understood, however, that the drawing is for the purpose of illustration only, and is not designed as a definition of the limits of the invention, reference being had to the appended claims for this purpose.

In the drawing,

Fig. 1 is a longitudinal sectional view of a device embodying the invention; and Fig. 2 is an exploded perspective view of the plunger, fixed core, and spring.

Reference numeral 10 indicates a cup-shaped shell or housing element closed at one end by a plate 11 extending transversely thereof and provided with means in the form of a flange 12 by which the device may be mounted upon a suitable support or upon the housing of another device with which it may be operatively associated, as for example, an engine starting mechanism of the character shown in Patent No. 1,833,948 granted to Raymond P. Lansing on December 4, 1931, which mechanism includes an engine-engaging clutch element shiftable in one direction in response to energization of a solenoid whose movable core or plunger is mechanically interlinked with said engine engaging clutch element by any suitable means.

The plate 11 is provided with a central opening, and a guide member 25 is mounted with its upper end suitably fixed in said opening as by means of the upset flange or lip indicated at 26.

The member 25 extends inwardly from the plate 11 and constitutes a fixed magnetic pole piece centrally located within the solenoid. A connecting member in the form of a rod 27 of nonmagnetic material is mounted to slide freely within pole piece 25, and is provided at one end with a stop 28 held thereon by suitable means 29 secured to the rod 27. At its opposite end connecting rod 27 carries movable core or plunger 30 of magnetic material and of slightly smaller diameter than the outside diameter of the fixed pole piece 25. The plunger is suitably secured to the connecting rod 27 as by means of a pin 48 and at its opposite end is centrally bored and threaded to receive a screw 33 and a stranded wire or cable 32 anchored in said screw 33 as indicated at 31, said cable having connection at its opposite end (not shown) with the device to be actuated such as, for example, the clutch shifting mechanism of the above identified Lansing patent. Also as in said Lansing patent a suitable spring or equivalent means (not shown) will be provided to maintain the plunger 30 in the position indicated in Fig. 1 until such time as current is caused to flow through the solenoid winding 34, whereupon the resulting magnetic field produces an inward movement of the plunger 30 to close the gap between the cooperating pole pieces 30 and 25 and thus producing movement of the linkage of which the elements 32 and 33 are suitable parts.

The spool 38 of suitable insulating material surrounds the non-magnetic plunger guide-sleeve 42 and receives the solenoid winding 34 as well as the terminal posts 35 and 36 which, as shown, are molded in the head portion 37 of the spool 38. At their outer ends the terminal posts 35 and 36 receive conductor attaching means in the form of nuts 41 and 46 and terminal elements 45, said conducting parts being insulated from the housing element 11 by suitable non-conducting bushings as indicated at 39 and 40. Conductors for attachment to terminals 45 may be led into the housing 47 through opening 44.

As indicated best in Fig. 2 the novel means of the present invention for preventing undesired transverse or other movement of the plunger 30 during periods of nonenergization of the solenoid, includes a flat resilient element in the nature of a spring of the leaf type having one end thereof turned as indicated at 51 for reception in a correspondingly shaped transverse slot 52 provided in the fixed core element 25 at the portion thereof which registers with the longitudinally extending recess portion 53 in which the straight section 54 of the spring is disposed when the parts are in the assembled position indicated in Fig. 1. The remaining section 55 of the spring is curved as indicated in Fig. 2 so that it bears against sleeve 42 in such manner that its upturned tip 56 exerts pressure radially upon the longitudinally extending groove 57 of the plunger 30 and thus tends to hold the said plunger against any movement except that which is induced by the superior force resulting from actual energization of the solenoid wire 34. Since such energization occurs only occasionally the amount of wear upon the plunger and associated parts is held to a minimum, all the excessive wear due to unchecked impulses which are normally transmitted to such a device because of its association with some other constantly operating mechanism such as an internal combustion engine, being eliminated by the absorbing and damping action of the spring 55.

It will be understood that the two ends (not shown) of the winding 34 connect with the terminal posts 35 and 36, to which they are mechanically and electrically held in any conventional manner, the head portion 37 of the spool 38 being suitably recessed adjacent said terminal posts to receive said wire ends.

What is claimed is:

1. The combination with a solenoid spool and a magnetic pole-piece secured thereto, of a second pole-piece slidable along the axis of the first-named pole-piece and spool, said second pole-piece having a flat exterior surface extending longitudinally thereof, and means comprising a flat-sided resilient strip engageable with said flat exterior surface, and interposed between said spool and slidable pole-piece and operable in any attitude from the horizontal to the vertical to yieldably hold the latter against transverse and turning movements during periods of solenoid deenergization.

2. The combination with a magnetic pole-piece, of a second pole-piece slidable along the axis of the first-named pole-piece, said second pole-piece having a flat exterior surface extending longitudinally thereof, and means mounted in said first-named pole-piece in any attitude from the horizontal to the vertical and acting upon the slidable pole-piece to yieldably hold the latter against transverse and turning movements, said means comprising a flat-sided resilient strip engageable with said flat exterior surface on said slidable pole-piece, in every position of the latter, to restrain all movement thereof, except axial movement.

3. The combination with a solenoid spool and a magnetic pole-piece secured thereto, of a second pole-piece slidable along the axis of the first-named pole-piece and spool, said second pole-piece having a flat exterior surface extending longitudinally thereof, and means mounted in said first-named pole-piece and acting upon the slidable pole-piece and operable in any attitude from the horizontal to the vertical to yieldably hold the latter against transverse and turning movements during periods of solenoid deenergization, said holding means being disposed wholly within the bore of said spool, and having only surface contact therewith.

DONALD M. BERGES.